US007221936B2

(12) United States Patent
Purdy et al.

(10) Patent No.: US 7,221,936 B2
(45) Date of Patent: May 22, 2007

(54) METHOD AND APPARATUS FOR PERSONALIZATION OF A PUBLIC MULTIMEDIA COMMUNICATIONS TERMINAL

(75) Inventors: Kermit Hal Purdy, Bernardsville, NJ (US); David G. Unger, Mendham Township, Morris County, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 11/350,984

(22) Filed: Feb. 9, 2006

(65) Prior Publication Data

US 2006/0129639 A1 Jun. 15, 2006

Related U.S. Application Data

(63) Continuation of application No. 10/613,724, filed on Jul. 3, 2003, now Pat. No. 7,039,411, which is a continuation of application No. 09/414,135, filed on Oct. 7, 1999, now Pat. No. 6,658,254.

(60) Provisional application No. 60/114,583, filed on Dec. 31, 1998.

(51) Int. Cl.
*H04M 3/42* (2006.01)
*H04Q 7/20* (2006.01)

(52) U.S. Cl. .................. 455/417; 455/445; 455/414.2; 455/457; 455/414.1

(58) Field of Classification Search ................ 455/417, 455/466, 445, 414.1, 414.2, 457
See application file for complete search history.

(56) References Cited

U.S. PATENT DOCUMENTS

| 4,313,035 | A | | 1/1982 | Jordan et al. |
|---|---|---|---|---|
| 5,243,645 | A | | 9/1993 | Bissell et al. |
| 5,315,636 | A | | 5/1994 | Patel |
| 5,533,113 | A | | 7/1996 | Ozawa et al. |
| 5,550,907 | A | | 8/1996 | Carlsen |
| 5,796,394 | A | | 8/1998 | Wicks et al. |
| 5,812,795 | A | * | 9/1998 | Horovitz et al. ............ 709/245 |
| 5,822,418 | A | | 10/1998 | Yacenda et al. |
| 6,009,333 | A | | 12/1999 | Chaco |
| 6,052,440 | A | * | 4/2000 | Yuhn ....................... 379/88.13 |
| 2002/0078228 | A1 | * | 6/2002 | Kuisma et al. ............. 709/237 |

* cited by examiner

*Primary Examiner*—Lester G. Kincaid
*Assistant Examiner*—Marisol Figueroa

(57) ABSTRACT

A multimedia call is completed to a mobile user, who registered to receive a multimedia call at a multimedia terminal using a portable intelligent device. A mobile user record including a physical address of a multimedia terminal and a user address is stored. In response to a multimedia call addressed to the user address, the physical address is determined and call notification information is transmitted to the multimedia terminal at the physical address. The multimedia call is then completed to the multimedia terminal at the physical address.

17 Claims, 3 Drawing Sheets

METHOD AND APPARATUS FOR PERSONALIZATION OF A PUBLIC MULTIMEDIA COMMUNICATIONS TERMINAL

CROSS REFERENCE TO RELATED APPLICATION

The present application is a continuation of and claims the benefit of U.S. application Ser. No. 10/613,724, filed Jul. 3, 2003, which issued as U.S. Pat. No. 7,039,411 entitled "Method and Apparatus for Personalization of a Public Multimedia Communications Terminal," on May 2, 2006, which in turn is a continuation of and claims the benefit of U.S. application Ser. No. 09/414,135, filed Oct. 7, 1999, which issued as U.S. Pat. No. 6,658,254 entitled "Method and Apparatus for Personalization of a Public Multimedia Communications Terminal," on Dec. 2, 2003, which application further claims the benefit of U.S. provisional patent application Ser. No. 60/114,583 entitled "Method and Apparatus for Personalization of Public Multimedia Terminals Among Multiple Registrants," filed on Dec. 31, 1998.

FIELD OF THE INVENTION

The present invention provides a method of completing multimedia communications. More particularly, the invention relates to a method and apparatus for completing a multimedia call to a mobile user who has registered to receive a multimedia call at a multimedia terminal using a portable intelligent device.

BACKGROUND OF THE INVENTION

A portable intelligent device ("PID"), also known as a Personal Digital Assistant ("PDA"), allows a person to carry and access a wide variety of data, such as address and phone data, date book and scheduling information, expense data, e-mail messages, memoranda, to-do lists, etc. An example of such a PID is the Palm V Organizer from 3Com Corporation. The Palm V includes a serial port that allows the Palm V to be coupled to a personal computer to import and export data. The Palm V also includes an infrared ("IR") port that allows the Palm V to transmit data to and receive data from other devices having an IR port, such as another Palm V.

Public "pay phones" and cellular communication technology (e.g., cellular phones) allow a person to easily initiate an interactive voice communication (e.g., a voice phone call) with another person. It has been more difficult for a person who is located away from home or office to easily receive calls unless various non-systematic, ad-hoc mechanisms are used to notify the person's friends, family, and work colleagues of the address (e.g., phone number) of a nearby multimedia terminal (e.g., telephone).

Typical public pay phones do not adequately allow a person who is located away from home or office to easily receive calls because a caller to that person cannot know in advance the phone number of a public phone to which the mobile person is in close proximity at any given time. Cellular phone technology does allow a cellular phone subscriber to always have a known phone number, but current battery technology deters a cellular phone subscriber from leaving a cellular phone constantly on to receive an incoming call. Moreover, the typical higher price of cellular communication dampens the willingness of a cellular phone subscriber to blithely advertise and accept any and all incoming phone calls.

The obstacles restricting a person's ability to receive incoming communications are exacerbated with the increase in types of communications media. Even if cellular phone technology overcomes the obstacles noted above, it will still not be easy for a mobile person to receive a paper fax from a cellular phone or participate in a video conference. This difficulty includes the expense and physical bulk of multimedia receivers and transmitters (e.g., a fax machine, a video camera) and the large bandwidth requirements of multimedia communications (e.g., a video phone call) that cannot be met practically in the wireless electromagnetic spectrum.

The present invention in one embodiment advantageously allows a mobile person to be the recipient of incoming multimedia calls by utilizing recent technological advances, such as the increasing ubiquity of standard data networking technology based on packet-switched Internet Protocol ("IP") networks, the use of IP networks for multimedia call transmission and call signaling, the increasing computing and storage capacity of portable intelligent devices (e.g., at present these devices are typically handheld PDAs, but soon such computing and storage capacity will be available in smaller devices, such as watches, jewelry, or implants), and the increasing ability of a PID to communicate with other devices using wireless technology, such as infrared data transmissions, a wireless Local Area Network ("LAN"), wireless Wide Area Network ("WAN") and/or a wireless Internet service provider ("WISP").

SUMMARY OF THE INVENTION

The present invention provides a method and apparatus for completing a multimedia call to a mobile user registered to receive a multimedia call at a multimedia terminal using a portable intelligent device. In an embodiment of the present invention, a mobile user record including a physical address of a multimedia terminal and a user address is stored, the physical address is determined in response to a multimedia call addressed to the user address, call notification information is transmitted to the multimedia terminal at the physical address, and the multimedia call is completed to the multimedia terminal at the physical address.

DETAILED DESCRIPTION

A method and apparatus for completing a multimedia call is described. In the following description, for purposes of explanation, numerous specific details are set forth to provide a thorough understanding of the present invention. It will be obvious, however, to one skilled in the art that the present invention may be practiced without these specific details. In other instances, well known structures and devices are shown in block diagram form. Furthermore, it is readily apparent to one skilled in the art that the specific sequences in which steps are presented and performed are illustrative and it is contemplated that the sequences can be varied and still remain within the spirit and scope of the present invention.

Figure 1:
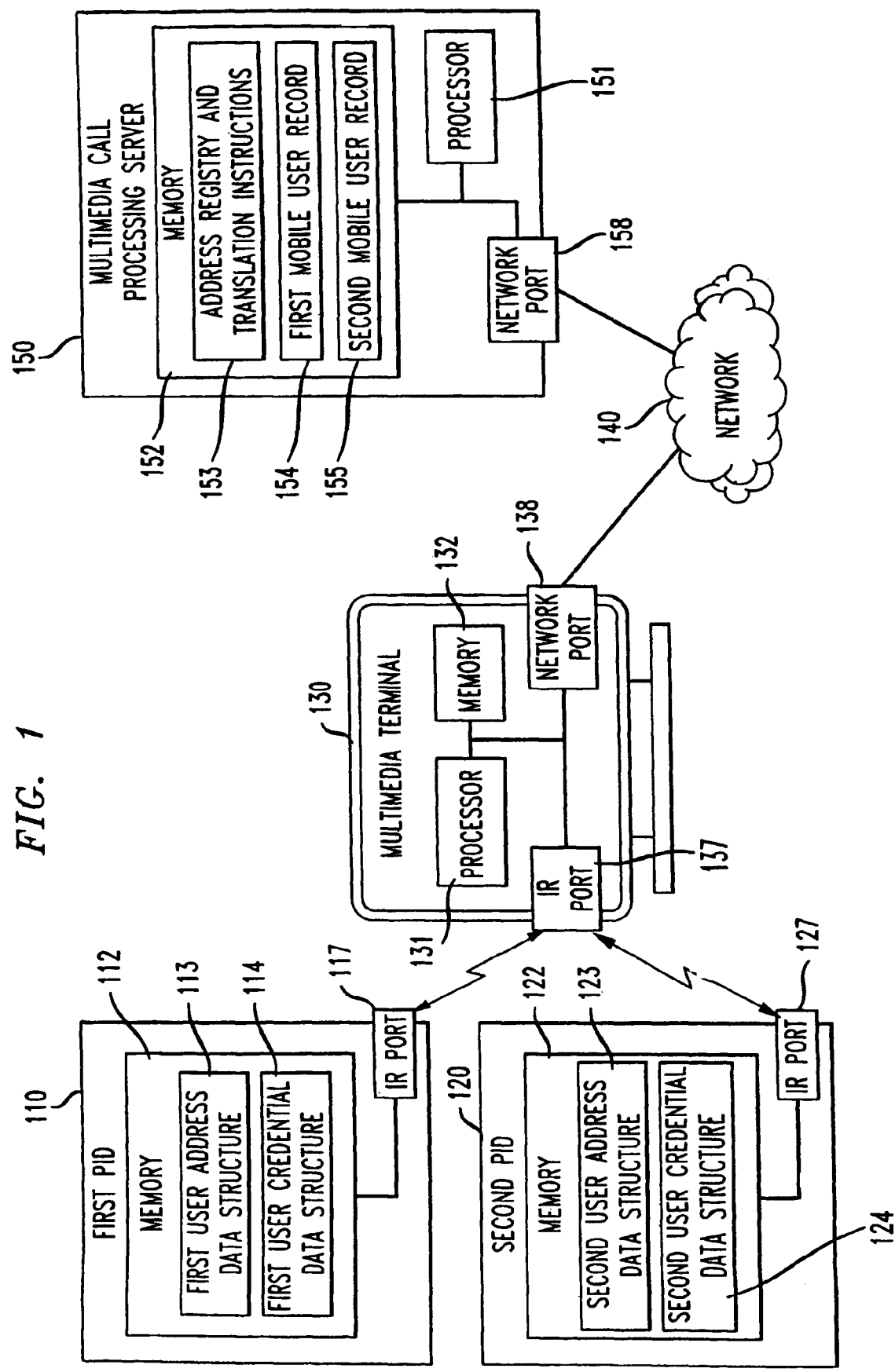
FIG. 1 shows a system in accordance with an embodiment of the present invention.

FIG. 1 shows a system in accordance with an embodiment of the present invention. A first PID 110 and second PID 120 can each transmit a message to and receive a message from a multimedia terminal 130, which message transmission is described in greater detail below. Multimedia terminal 130 is coupled to a multimedia call processing server 150 via network 140. The term "coupled" means connected directly or indirectly. Thus, A is "coupled" to C if A is directly connected to C, and A is "coupled" to C if A is connected directly to B, and B is directly connected to C.

First PID 110 includes a processor (not shown) coupled to memory 112 and an IR port 117. Memory 112 is any device adapted to store digital information, such as Random Access Memory (RAM), flash memory, a hard disk, an optical digital storage device, a combination thereof, etc. In one embodiment, and as illustrated in FIG. 1, memory 112 includes a first user address data structure 113 and a first user credential data structure 114. In another embodiment, a PID memory includes a first user address data structure, but not necessarily a first user credential data structure. First user address data structure 113 stores a user address, which can be a standard ten digit phone number (e.g., 732-732-0732), an IP address (e.g., 135.207.23.157), an e-mail address (e.g., JDoe@employer.com), etc. The user address can be an address independent of the PID (e.g., an e-mail address) or an address of a communications device or connection such as an office telephone number, an IP address of a computer, a facsimile number, etc. User credential data structure 114 can store authorization and/or authentication operations information known in the art, such as a user account identifier, a password, a personal identification number ("PIN"), a public key, a shared secret key, etc. IR port 117 is coupled to memory 112 and transmits data to and receives data from an IR port of another communications device, e.g. a PID, a personal computer, a multimedia communications terminal, etc. In one embodiment of the present invention, cryptography is utilized to allow authentic, private, and otherwise secure communication of data between the PID 110 and the multimedia terminal 130. An example of such cryptography is the use of public key/private key pairs to authenticate and encrypt/decrypt messages. First PID 110 can have a first PID address that identifies the first PID to a wireless LAN connection, an infrared port, a wireless Internet service provider, a wireless network, etc.

Second PID 120 includes a processor (not shown) coupled to memory 122 and an IR port 127. In one embodiment, and as illustrated in FIG. 1, memory 122 includes a second user address data structure 123 and a second user credential data structure 124. In another embodiment, a PID memory includes a second user address data structure, but not necessarily a second user credential data structure. Second user address data structure 123 stores a user address, and second user credential data structure 124 can store authorization and/or authentication operations information known in the art, such as a user account identifier, a password, a personal identification number ("PIN"), a public key, a shared secret key, etc. IR port 127 is coupled to memory 122. In one embodiment of the present invention, cryptography is utilized to allow authentic, private, and otherwise secure communication of data between the second PID 120 and the multimedia terminal 130. In another embodiment in accordance with the present invention, second PID 120 can have a second PID address that identifies the second PID to a wireless LAN connection, an infrared port, a wireless Internet service provider, a wireless network, etc.

Multimedia terminal ("MMT") 130 includes a processor 131 coupled to a memory 132, an IR port 137, and a network port 138. Multimedia terminal 130 can also include the necessary multimedia receivers and transmitters necessary for multimedia communications over network 140. Examples of multimedia receivers/transmitters include a microphone, audio speakers, a keyboard, a video display, a data display, and a facsimile device. For simplification, the multimedia receiver/transmitter components of the multimedia terminal 130 are not shown in the illustration. As used to describe the present invention, multimedia communications include audio, video, graphics, animation, facsimile, text communications, a combination thereof, etc. Network port 138 is adapted to be coupled to network 140. In one embodiment, network port 138 is coupled to the network 140 via a physical connection, such as a wire cable, fiber link, or coaxial cable. Such wire or fiber connections typically can support higher bandwidths than wireless connections. IR port 137 is coupled to memory 132 and network port 138. Memory 132 is any device adapted to store digital information, such as Random Access Memory (RAM), flash memory, a hard disk, an optical digital storage device, a combination thereof, etc. Multimedia terminal 130 has a physical address. As used to describe the present invention, the term "physical address" encompasses an address that identifies the multimedia terminal to the network 140. For example, a public pay phone can have a phone number for incoming calls, and calls made to that physical address are completed to that public pay phone. A residential telephone line can have a fixed phone number such that calls made to that number are completed to that residential telephone line. A computer coupled to an IF network terminal can have an IP address that identifies that computer to other computers coupled to the IP network.

Each of first PID 110 and second PID 120 can transmit a message to and receive a message from multimedia terminal 130. For example, as illustrated in FIG. 1, first PID 110 transmits data via IR port 117 to multimedia terminal 130 via IR port 137. Such data transmission represents an example of a low-bandwidth connection in an embodiment of the present invention. In another embodiment, a PID can transmit a message to a multimedia terminal by other ways known in the art such as a physical cable (e.g., wire, fiber, Universal Serial Bus ("USB") connection, serial port cable, etc.) connected to both the PID and the multimedia terminal, a physical joining of the PID and the multimedia terminal that establishes electrical connectivity between the two (e.g., via a docking station coupled to or part of the multimedia terminal and into which the PID is docked), or a wireless connection between the PID and the multimedia terminal (e.g., wireless LAN, wireless IP, wireless WAN, radio transmission, etc.).

Multimedia terminal 130 is coupled to multimedia call processing server 150 by network 140, which can comprise one or more of the following: a LAN, an IP network, a WAN, an asynchronous transfer mode ("ATM") network, a circuit-switched network, etc. In an embodiment of the present invention, the network connection between multimedia terminal 130 and multimedia call processing server 150 is a high-bandwidth connection such as an ATM network connection (e.g., 155.52 million bits per second, 622.08 million bits per second), a high-speed IP connection (e.g., a T1, T3, T4 connection), etc.

Multimedia call processing server 150 includes a processor 151, memory 152, and network port 158. The processor 151 in one embodiment is a general purpose microprocessor, such as the Pentium III processor manufactured by the Intel Corporation of Santa Clara, Calif. In another embodiment, the processor 151 is an Application Specific Integrated Circuit (ASIC), which has been designed to perform in hardware and firmware at least part of the method in accordance with an embodiment of the present invention. Memory 152 is any device adapted to store digital information, such as Random Access Memory (RAM), flash memory, a hard disk, an optical digital storage device, a combination thereof, etc. Memory 152 is coupled to processor 151 and network port 158 adapted to be coupled to a network.

Memory 152 includes address registry and translation instructions ("ARTI") 153, a first mobile user record 154, and a second mobile user record 155, each of which will be described in further detail below. Memory 152 also includes authorization and authentication instructions ("AAI") (not shown), which are known in the art and perform authorization and authentication operations. Authorization operations include determining whether a mobile user is authorized to receive a call, how long a mobile user can be provided communications services, etc. For example, a mobile user may be authorized to receive a certain number of multimedia calls during a period (e.g., 25 calls per month), a certain number of minutes of multimedia calls per period (e.g., 300 minutes a month), or an unspecified amount (e.g., is billed for minutes actually used), etc. Alternatively, the authorization information can be a credit card number or other financial account to charge for fees associated with a multimedia call. Authentication operations are also known in the art. For example, authentication information can be utilized to provide an indication that the user address is transmitted by the proper mobile user. Authentication information includes a user credential stored within the PID (e.g., a password, a PIN, a secret key, a public key, etc.), a user credential that a mobile user is prompted to enter (e.g., a password, a PIN, etc.), or a combination of the two. In one embodiment, the AAI receive a first user address and a first user credential from the first PID 110 and determine whether the user address is authentic and authorized. In another embodiment, cryptography is used to allow authentic, private, and otherwise secure communication of data between the PDA and the multimedia terminal, and the AAI include instructions to perform cryptographic techniques, such as using public key/private key pairs to authenticate and encrypt/decrypt messages. In another embodiment in accordance with the present invention, the AAI access user and/or accounting databases when performing authentication and authorization operations.

In one embodiment of the present invention, authentication and authorization operations are performed after receiving a user address from a PID. A data message including a first user credential can be sent from first PID 110 to the multimedia call processing server 150 with the multimedia terminal 130 acting as a data bridge between the first PID 110 and the multimedia call processing server 150. Data bridge apparatus and techniques are known in the art. In an embodiment in accordance with the present invention, industry standard data transport bridge techniques are employed to allow advantageous service deployments. Industry standard data transport techniques can allow data message transmissions between first PID 110 and a multimedia call processing server 150 to be conducted without the multimedia terminal 130 having knowledge of the content of a data message or of a cryptographic technique employed with a data message.

The address registry and translation instructions 153 ("ARTI") include instructions to store associated addresses (e.g., a first user address and a physical address) in a mobile user record of memory 152 and instructions to determine an associated address (e.g., a physical address) from a mobile user record upon receiving an address (e.g., a user address). In one embodiment, the ARTI 153 include instructions to confirm that the AAI have determined that a user address has been authenticated and authorized prior to being registered (i.e., associated) with a physical address in a mobile user record (e.g., by checking the status of a data register, a data flag, etc.).

The first PID 110 transmits a first data message including a first user address to the multimedia terminal 130. The multimedia terminal 130 transmits a message, including the physical address of the multimedia terminal 130 and the first user address, to the multimedia call processing server 150. The ARTI 153 can create a mapping (i.e., correlation, association, registration) between the received first user address and physical address by storing each in the first mobile user record 154 in memory 152. In one embodiment of the present invention, the first mobile user record 154 encompasses two entries in a row of a lookup table including two columns and a plurality of rows. The first user address is stored in the first column of a particular row and the physical address is stored in the second column of that particular row. Table 1 below illustrates a lookup table storing a first mobile user record that includes a registration of a user address "JDoe" with a physical address "135.207.23.157."

TABLE 1

| User Address | Physical Address |
|---|---|
| . . . | . . . |
| JDoe | 135.207.23.157 |
| RSmith | 135.207.23.157 |
| . . . | . . . |

Other methods and apparatus for associating data in a database are well known in the art. For example, in one embodiment, a data matrix comprises a plurality of columns and two rows, with each address of a correlated pair addresses stored in a common column. In another embodiment, each address of a pair of mapped addresses are stored in a memory in sequence, with the address of a first address stored immediately prior to the corresponding address of a second address.

The ARTI 153 also perform address translation for a multimedia call addressed to a first user address by determining the physical address registered with the first user address. In one embodiment, the multimedia call processing server is part of an H.323 compliant communications system, and the ARTI are performed by an H.323 Gatekeeper component in conjunction with a dynamic database containing mapping information between user addresses and physical addresses. In another embodiment, the multimedia call processing server receives a multimedia call addressed to a first user address via a call forwarding technique known in the art, and determines the first user address from Automatic Number Information ("ANI") included with the multimedia call. With the first user address, the ARTI of multimedia call processing server 150 can determine the physical address registered with the first user address in the first mobile user record by methods well known in the art of data retrieval from a database. In another embodiment, the multimedia call processing server 150 is coupled to an ATM network, receives a query from an ATM switch including the first user address, determines the physical address associated with the first user address in the first mobile user record 154, and transmits to the ATM switch a response including the physical address. After the ARTI determine the physical address registered with the first user address, the multimedia call processing server 150 can cause the multimedia call to be completed to the physical address, i.e., to the multimedia terminal 130.

In one embodiment of the present invention, a plurality of user addresses are registered to receive multimedia calls at multimedia terminal 130. For example, first PID 110 can transmit a first data message to multimedia call processing server 150 via multimedia terminal 130 to register a first user address with the physical address of multimedia terminal 130. Second PID 120 can also transmit a second data message to multimedia call processing server 150 via multimedia terminal 130 to register a second user address with the physical address of multimedia terminal 130. The registrations can be conducted sequentially, i.e., the first user address registration is completed prior to the second user address registration. In another embodiment, the registrations can be conducted simultaneously (i.e., overlapping in time). For example, the first data message transmitted between first PID 110 and multimedia call processing server 150 via multimedia terminal 130 can be transmitted using the Internet Protocol, where the first data message is divided into a series of data packets. The second data message transmitted between second PID 110 and multimedia call processing server 150 via multimedia terminal 130 can also be transmitted using the Internet Protocol, such that the second data message is divided into a series of data packets. The multimedia terminal 130 can receive a series of data packets from the first PID 110 and then a series of data packets from the second PID 120 such that multimedia terminal 130 is receiving the first data message from the first PID 110 and the second data message from the second PID 120 over the same period of time. In accordance with one embodiment of the present invention, a plurality of different user addresses can be associated with one physical address of a multimedia terminal 130. Table 1, illustrated above, stores (1) a first mobile user record including a first user address "JDoe" and the physical address "135.207.23.157" and (2) a second mobile user record including a second user address "RSmith" and the same physical address "135.207.23.157".

After the multimedia call processing server 150 determines the physical address to which a multimedia call addressed to a first user address will be completed, the multimedia call processing server 150 can transmit call notification information to the multimedia terminal 130 in concert with (e.g., prior to, while, after) completing the multimedia call to the multimedia terminal 130. In one embodiment of the present invention, the call notification information includes the first user address. Upon receiving call notification information including the first user address, the multimedia terminal 130 generates an announcement to notify the first user that the multimedia call addressed to the first user address will be (or is, or has been) completed to the multimedia terminal 130. The announcement can be a multimedia announcement, including audio, video, text, or a combination thereof, etc. For example, in one embodiment, the multimedia terminal 130 produces a Synthesized Voice message, such as "Incoming Call for JDoe." In another embodiment, the multimedia terminal 130 generates a text message (e.g., "Call for JDoe") and transmits it over IR port 137 to each PID within the data transmission range of the IR port 137. In one embodiment, the multimedia terminal generates an audible signal indicating an incoming call (e.g., ring, buzz, chirp, etc.) and displays a textual message including the first user address (e.g., "Incoming call for JDoe").

In another embodiment of the present invention, the first PID 110 transmits a first set of data, including a first user address and a first PID address, to the multimedia terminal 130, which in turn transmits its physical address and the first set of data to the multimedia call processing server 150. The ARTI 153 can create a mapping between the received first user address, first PID address, and physical address by storing each in the first mobile user record 154. The second PID 120 also transmits a second set of data, including a second user address and a second PID address, to the multimedia terminal 130, which in turn transmits its physical address and the second set of data to the multimedia call processing server 150. The ARTI 153 can create a mapping between the received second user address, second PID address, and physical address by storing each in the second mobile user record 154. For example, Table 2, illustrated below, stores (1) a first mobile user record that registers a first user address "JDoe" with a first PID address "PID_One" and physical address "135.207.23.157" and (2) a second mobile user record that registers a second user address "JDoe" with a second PID address "PID_Two" and the physical address "135.207.23.157."

TABLE 2

| User Address | PID Address | Physical Address |
|---|---|---|
| ... | ... | ... |
| JDoe | PID_One | 135.207.23.157 |
| RSmith | PID_Two | 135.207.23.157 |
| ... | ... | ... |

After receiving a first multimedia call to the first user address, the multimedia call processing server 150 determines the first PID address and physical address corresponding to the first user address. In one embodiment, in concert with completing the multimedia call to the physical address, the multimedia call processing server 150 transmits call notification information, including a call notification message and the first PID address, to the multimedia terminal 130. The multimedia terminal 130 then transmits the call notification message to the first PID address, i.e., the first PID. In another embodiment, the multimedia call processing server 150 transmits call notification information, including the first PID address, to the multimedia terminal 130, which generates and transmits a call notification message to the first PID address, i.e., the first PID. The call notification message can be a multimedia message, including audio, video, text, or a combination thereof, etc.

Figure 2:
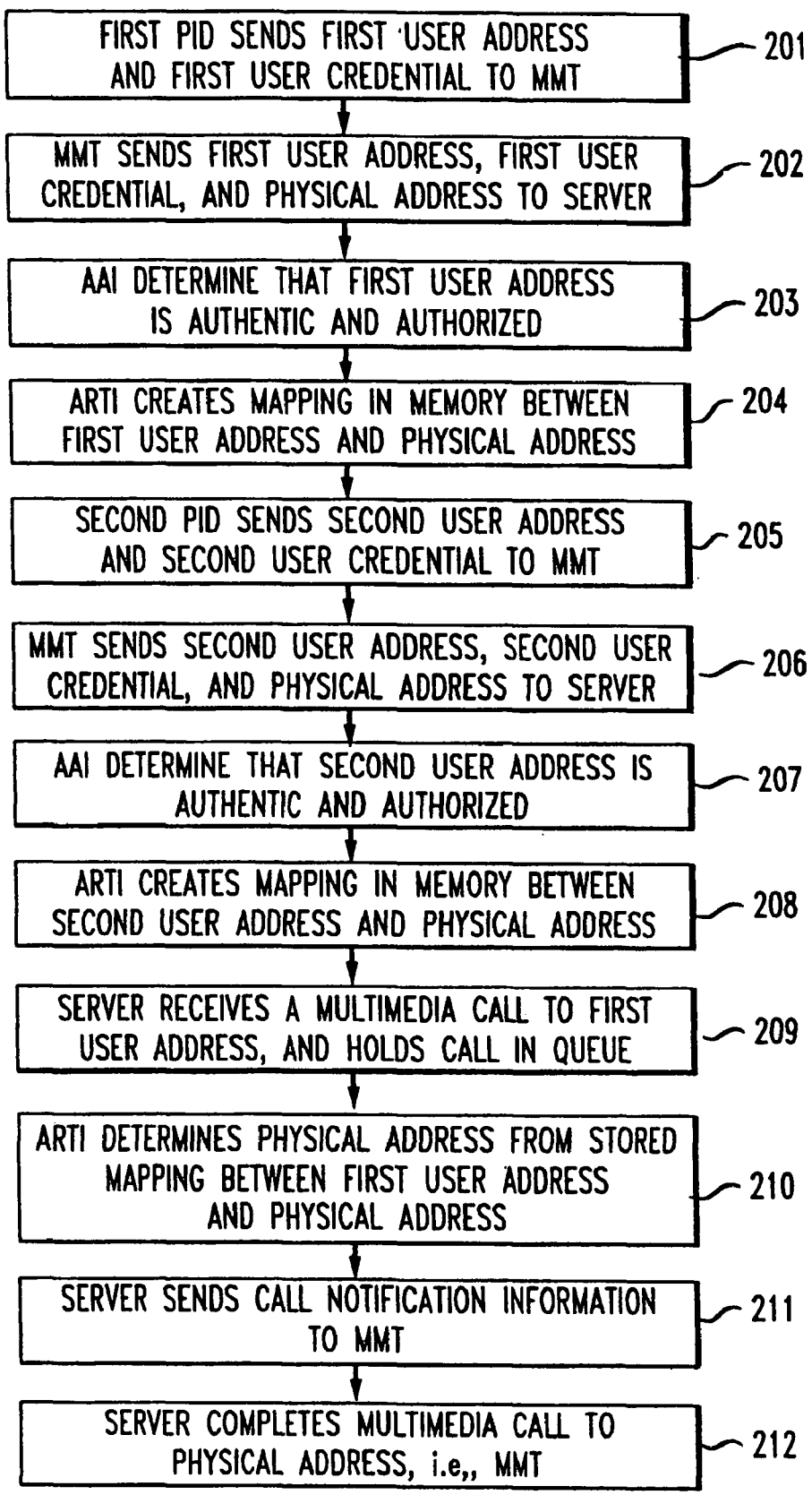
FIG. 2 is a flowchart illustrating exemplary steps executed in accordance with an embodiment of the present invention.

FIG. 2 is a flowchart illustrating exemplary steps executed in accordance with an embodiment of the present invention, which embodiment advantageously provides a measure of security in completing a multimedia call to a mobile user registered to receive calls at a multimedia terminal. In this embodiment, a plurality of mobile users, including a first mobile user, has registered at a multimedia terminal in accordance with the present invention. A multimedia call addressed to a first user is received, but not completed to the multimedia terminal until after a confirming message, including a first user credential, is received from the first user.

A first mobile user with a first PID causes the first PID to transmit a message including a first user address and a first user credential to a multimedia terminal ("MMT") (step 201). The multimedia terminal transmits a message including the physical address of the multimedia terminal, the first user address, and first user credential to a multimedia call processing server ("server") (step 202). The server contains authentication and authorization instructions ("AAI") that determine, based at least partly upon the first user address and first user credential, that the first user address is authentic and authorized for registration with the server (step 203). The server also contains address registry and translation instructions ("ARTI") that create a mapping in memory between the first user address and physical address (step 204). A second mobile user with a second PID causes the second PID to transmit a message including a second user address and a second user credential to a multimedia terminal ("MMT") (step 205). The multimedia terminal transmits a message including the physical address of the multimedia terminal, the second user address, and second user credential to a multimedia call processing server ("server") (step 206). The AAI determine, based at least partly upon the second user address and second user credential, that the second user address is authentic and authorized for registration with the server (step 207). The ARTI create a mapping in memory between the second user address and physical address (step 208).

The server then receives a multimedia call addressed to the first user address and holds the multimedia call in a queue (step 209). The ARTI determine the physical address corresponding to the first user address based at least partly upon the stored mapping between the user address and the physical address (step 210). The server sends call notification information to the multimedia terminal (step 211). In one embodiment the call notification information includes information that the multimedia terminal can announce, e.g., the user address, the called party's name, etc. In another embodiment, the call notification information can be a multimedia announcement that the multimedia terminal can announce (e.g., audibly), transmit (e.g., broadcast, transmit from the multimedia terminal to the first PID, etc.), display, etc. The server then completes the multimedia call to the multimedia terminal, i.e., the physical address (step 212).

Figure 3:
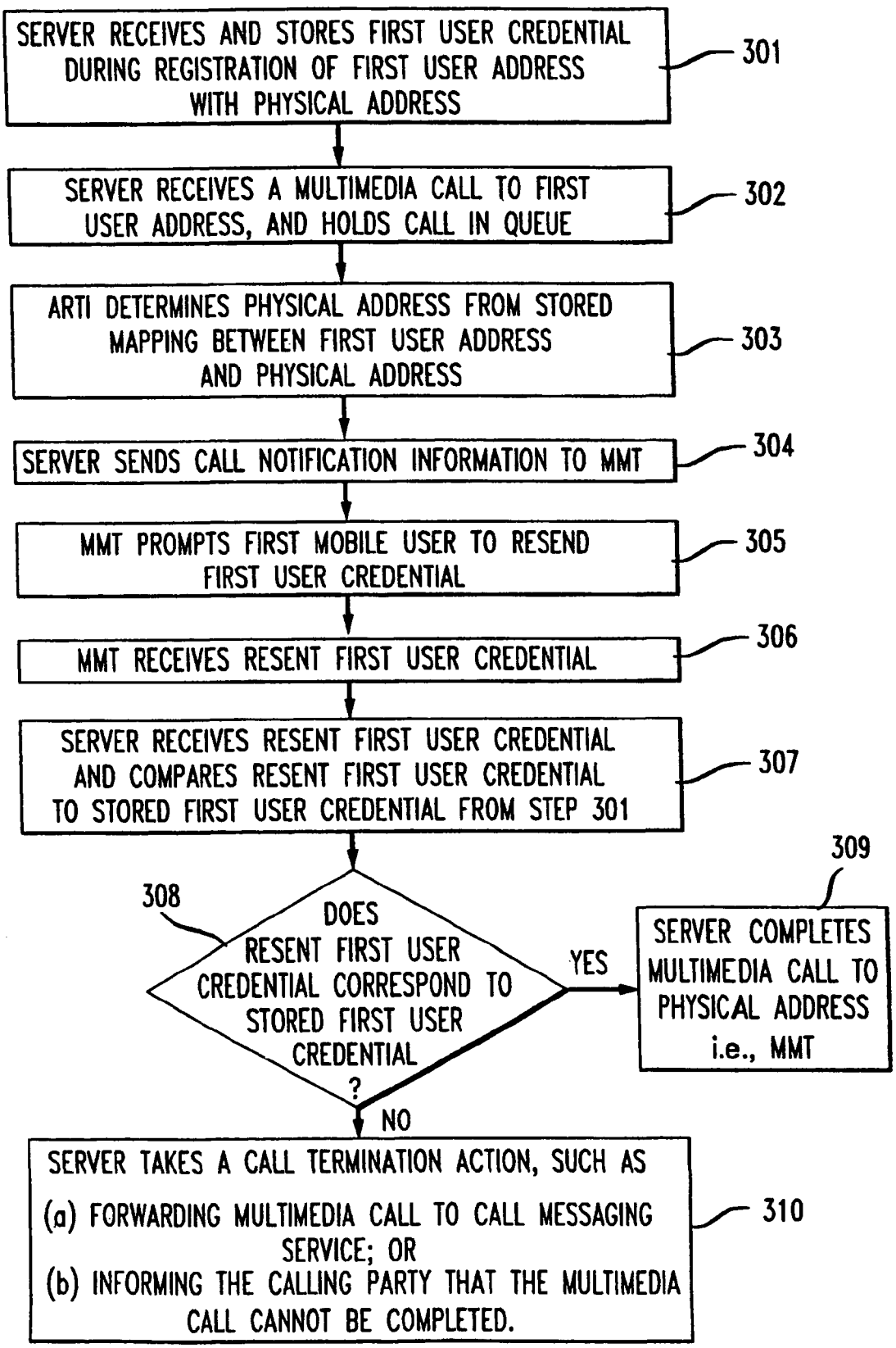
FIG. 3 illustrates exemplary steps executed in accordance with an embodiment of the present invention.

FIG. 3 illustrates steps executed in accordance with an embodiment of the present invention which provides a measure of security in completing a multimedia call to a first mobile user. The multimedia call processing server receives the first user credential during registration of the first user address with the physical address and stores the first user credential in a first mobile user record (step 301). A multimedia call addressed to the first user address is received and held in a queue (step 302), and the physical address registered with the first user address is determined (step 303). The multimedia terminal receives call notification information from the server (step 304) and sends a notification to the first PID that the multimedia call will not be completed to the multimedia terminal until after the first user credential is resent to the multimedia terminal (step 305). The multimedia terminal then receives a re-sent first user credential from the first PID (step 306). The re-sent first user credential is then received by the server and compared to the stored first user credential, i.e., the first user credential received and stored in step 301. If the re-sent first user credential corresponds to the stored first user credential, the multimedia call is completed to the multimedia terminal. (step 309). If the re-sent first user credential does not correspond to the stored first user credential (e.g., the re-sent credential does not match the stored credential), the server can take a call termination action, such as forwarding the multimedia call to a call messaging service (e.g., voice mail, a multimedia message center, etc.), informing the calling party that the multimedia call cannot be completed, etc. (step 310). In one embodiment of the invention, the server can repeat steps 304–308 a set number of times prior to taking a call termination action.

In another embodiment of the present invention, the multimedia call processing server stores the first user credential in a first mobile user record when the first user address is registered with the physical address, but the server does not use the first user credential to perform authentication or authorization operations. The multimedia call processing terminal, after receiving a multimedia call and prior to transmitting the multimedia call to the multimedia terminal, receives a re-sent first user credential from the first PID via the multimedia terminal and compares it to the stored first user credential. If the stored first user credential matches the re-sent first user credential, there is a certain amount of assurance that the proper mobile user (i.e., the first mobile user) is present at the multimedia terminal to receive the call.

In one embodiment in accordance with the present invention, a group of multimedia terminals are bundled together in a hunt group to serve the needs of a plurality of mobile users. Hunt groups are known in the art, and in a hunt group a plurality of telephone lines are associated such that if a first line is busy and cannot receive an incoming call, a next line is hunted to receive the incoming call. If that next line is busy and cannot receive the incoming call, another line is hunted, etc. In an embodiment of the present invention, after a first mobile user and a second mobile user have registered with a multimedia terminal in accordance with the present invention, a multimedia call to the second user is received by a multimedia call processing server. The multimedia call processing server determines the physical address registered with the second user address, and determines whether the physical address is available to receive a multimedia call. If the physical address is not available to receive the multimedia call, the multimedia call processing server determines whether the physical address is part of a hunt group. If the physical address is part of a hunt group, the multimedia call processing server determines an available physical address of the hunt group, and completes the call to that physical address in accordance with the present invention. This embodiment advantageously allows a multimedia call to be completed to a mobile user when the multimedia terminal at which the mobile user previously registered is occupied in serving the communication needs of another mobile user. The multimedia call can be completed to one of the multimedia terminals of the hunt group that is not engaged in interactive multimedia communications.

In accordance with one embodiment of the present invention, instructions adapted for execution are stored on a medium and distributed as software. The medium is any device adapted to store digital information, and corresponds to the memory of multimedia call processing server 150. For example, a medium is a portable magnetic disk, such as a floppy disk; or a Zip.RTM. disk, manufactured by the Iomega Corporation of Roy, Utah; or a Compact Disk Read Only Memory (CD-ROM) as is known in the art for distributing software. The medium is distributed to a user that has a processor suitable for executing instructions adapted for execution, e.g. a processor of server 150, etc. The term "adapted for execution" is meant to encompass any instructions that are ready for execution in their present form (e.g., machine code) by a processor, or require further manipulation (e.g., compilation, decryption, or provided with an access code, etc.) to be ready for execution by a processor.

The present invention advantageously allows a mobile user with a PID to securely and reliably communicate with a multimedia terminal to register to receive multimedia calls at the multimedia terminal. An embodiment of the present invention advantageously separates both (1) the data that enables secure authentication and authorization of a mobile user (e.g., service logic, credentials) and (2) the user address of the mobile user (e.g., a phone number, an e-mail address) from the device that physically contains and supports the necessary media receivers and transmitters (e.g., a multimedia terminal including a microphone, a speaker, a video camera, a video display, a facsimile machine, or a combination thereof).

What is claimed is:

1. A method for completing a multimedia call addressed to a user address of a mobile user at a multimedia terminal adapted to present messages in at least one of audio, video, text and facsimile formats and coupled through a network to a call processing server, the mobile user having registered to receive a multimedia call at the multimedia terminal by transmitting information including the user address to the multimedia terminal from a personal intelligent device ("PID") having a PID address, comprising:

receiving from the multimedia terminal at the call processing server both the user address received from the PID and the physical address of the multimedia terminal;

storing the user address and the physical address of the multimedia terminal in a mobile user record in the call processing server;

responsive to a multimedia call addressed to the user address, determining the physical address based at least partly from the mobile user record;

transmitting call notification information from the call processing server to the multimedia terminal at the physical address;

transmitting a call announcement message from the multimedia terminal addressed to the PID address; and completing the multimedia call to the multimedia terminal at the physical address.

2. The method of claim 1, wherein the user address is one of a telephone number, an Internet Protocol ("IP") address, and an e-mail address.

3. The method of claim 1 wherein the call announcement message is selected from audio, video and text messages.

4. The method of claim 1 wherein the information transmitted from the PID to the multimedia terminal was transmitted by one of a physical cable, infrared data transmission, a wireless Local Area Network ("LAN"), a wireless Wide Area Network ("WAN"), and a wireless Internet Service Provider ("WISP").

5. The method of claim 1 wherein the information transmitted from the PID to the multimedia terminal is encrypted.

6. The method of claim 1, wherein storing the user address includes storing the PID address, wherein the PID address was received from the PID via the multimedia terminal; and further comprising:

responsive to a multimedia call addressed to the user address, determining the PID address; and wherein transmitting call notification information to the multimedia terminal includes transmitting the PID address.

7. The method of claim 1, wherein the step of storing the user address and PID address comprises storing a plurality of user addresses and PID addresses in association with one multimedia terminal physical address.

8. The method of claim 1, further comprising:

receiving a user credential from the PID via the multimedia terminal; and completing the multimedia call to the multimedia terminal at the physical address only if the user address is determined to be authentic based at least in part from the user credential.

9. The method of claim 8, wherein completing the multimedia call to the multimedia terminal at the physical address includes:

receiving a second user credential; and completing the multimedia call to the multimedia terminal at the physical address only if the received second user credential corresponds to the stored user credential.

10. The method of claim 8 wherein the user credential is selected from a user account identifier, a password, a personal identification number ("PIN"), a public key and a shared secret key.

11. A method for processing a multimedia call addressed to a user address of a mobile user at a multimedia terminal adapted to present messages in at least one of audio, video, text and facsimile formats and coupled through a network to a call processing server, the mobile user having used a personal intelligent device ("PID") to register to receive a multimedia call at the multimedia terminal, comprising:

receiving at the call processing server the user address and the physical address of the multimedia terminal;

associating at the call processing server the physical address of the multimedia terminal and the user address;

responsive to a multimedia call addressed to the user address, determining the physical address based at least partly from the association of the physical address and the user address;

determining that the multimedia call cannot be completed to the physical address of the multimedia terminal;

determining a second physical address, wherein the physical address of the multimedia terminal and the second physical address are each part of a hunt group of physical addresses;

transmitting call notification information to the second physical address; and completing the multimedia call to the second physical address.

12. An apparatus for completing a multimedia call addressed to a user address of a mobile user to a multimedia terminal adapted to present messages in at least one of audio, video, text and facsimile formats and coupled to the apparatus through a network, the mobile user having registered, using a personal intelligent device ("PID") having an address, to receive a multimedia call at the multimedia terminal by transmitting information including the user address to the multimedia terminal from the PID, comprising;

a. means for receiving from the network the user address, the PID address and a physical address of the multimedia terminal;

b. a processor; and c. a memory, coupled to said processor, storing a plurality of instructions adapted to be executed by said processor to:

store the user address, the PID address and the physical address of the multimedia terminal in a mobile user record;

responsive to a multimedia call addressed to the user address, determine the physical address and the PID address based at least partly from the mobile user record;

transmit call notification information and the PID address to the multimedia terminal at the physical address; and complete the multimedia call to the multimedia terminal at the physical address.

13. The apparatus of claim 12, wherein:

the user address storing instructions include instructions to store a user credential received from the PID via the multimedia terminal; and the multimedia call completing instructions include instructions to complete the multimedia call to the multimedia terminal at the physical address only if the user address is determined to be authentic based at least in part from the user credential.

14. The apparatus of claim 13 wherein:

the user address storing instructions include instructions for receiving a second user credential; and the multimedia call completing instructions include instructions to complete the call to the multimedia terminal only if the received second user credential corresponds to the sored user credential.

15. The apparatus of claim 12 wherein the instructions responsive to a multimedia call include instructions for determining that the multimedia call cannot be completed to the physical address of the multimedia terminal;

determining a second physical address, wherein the physical address of the multimedia terminal and the second physical address are each part of a hunt group of physical addresses;

transmitting call notification information to the second physical address; and completing the multimedia call to the second physical address.

16. The apparatus of claim 12 wherein the user address storing instructions include instructions for storing a plurality of user addresses associated with a single multimedia terminal.

17. The apparatus of claim 12 wherein the network over which the user address, the PID address and a physical address are received from the multimedia terminal is one of a Local Area Network ("LAN"), an IP network, a Wide Area Network ("WAN"), an asynchronous transfer mode ("ATM") network and a circuit-switched network.

* * * * *